United States Patent [19]

Hashimoto et al.

[11] Patent Number: 4,876,601

[45] Date of Patent: Oct. 24, 1989

[54] IMAGING APPARATUS HAVING ZOOM CAPABILITY VIA READOUT VARIATION

[75] Inventors: Seiji Hashimoto, Yokohama; Tadanori Harada, Tokorozawa, both of Japan

[73] Assignee: Canon Kabushiki Kaisha, Tokyo, Japan

[21] Appl. No.: 168,176

[22] Filed: Mar. 15, 1988

[30] Foreign Application Priority Data

Mar. 31, 1987 [JP] Japan .................................. 62-77953

[51] Int. Cl.$^4$ .............................................. H04N 3/14
[52] U.S. Cl. ................................. 358/213.26; 358/180
[58] Field of Search .................... 358/180, 213.26, 209, 358/22; 340/731

[56] References Cited

U.S. PATENT DOCUMENTS

| | | | |
|---|---|---|---|
| 3,935,381 | 1/1986 | Petrocelli et al. | 358/180 |
| 4,002,824 | 1/1977 | Petrocelli et al. | 358/180 |
| 4,220,965 | 9/1980 | Heitmann et al. | 358/22 |
| 4,426,664 | 1/1984 | Nagumo et al. | 358/213.26 |
| 4,527,200 | 7/1985 | Takahashi et al. | 358/213 |
| 4,541,015 | 9/1985 | Itoh et al. | 358/209 |
| 4,546,349 | 10/1985 | Prohofsky et al. | 340/731 |
| 4,644,405 | 2/1987 | Roy et al. | 358/213.26 |
| 4,658,287 | 4/1987 | Chen | 358/48 |
| 4,689,686 | 8/1987 | Hashimoto et al. | 358/213.26 |
| 4,703,365 | 10/1987 | Mumford | 358/213.26 |
| 4,734,772 | 6/1987 | Akiyama | 358/213.26 |
| 4,746,979 | 5/1988 | Kashigi | 358/22 |
| 4,791,308 | 12/1988 | Nagashima | 250/578 |

FOREIGN PATENT DOCUMENTS 2913116 10/1980 Fed. Rep. of Germany .
2588709 4/1987 France .

OTHER PUBLICATIONS

*Digital Image Processing*, Gregory A. Bakes, ©1984, Prentice-Hall, Inc.

*Primary Examiner*—Jin F. Ng
*Assistant Examiner*—Stephen Brinich
*Attorney, Agent, or Firm*—Fitzpatrick, Cella, Harper & Scinto

[57] ABSTRACT

An imaging apparatus having an imaging device composed of pixels arranged in horizontal lines and vertical columns, and a vertical scanning circuit and a horizontal scanning circuit for scanning the area of the imaging device vertically and horizontally. The apparatus has a control circuit for enabling the vertical scanning circuit to scan the horizontal lines of pixels a plurality of times, thereby reading an image on the imaging device in a zoomed-out manner with a high degree of vertical resolution of the display image.

26 Claims, 8 Drawing Sheets

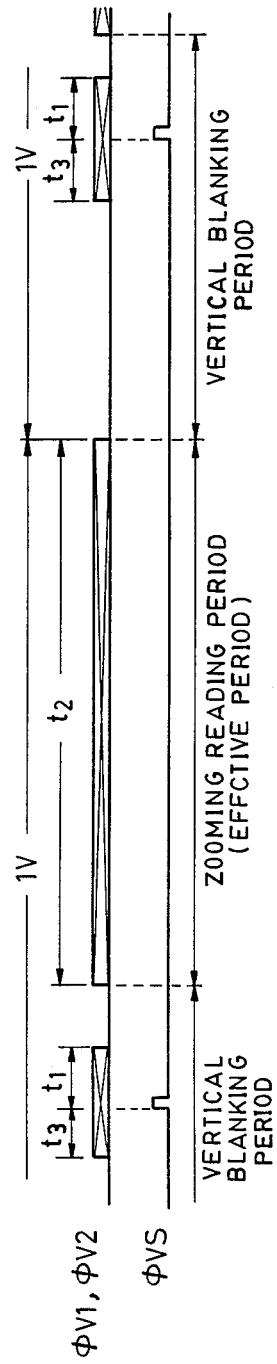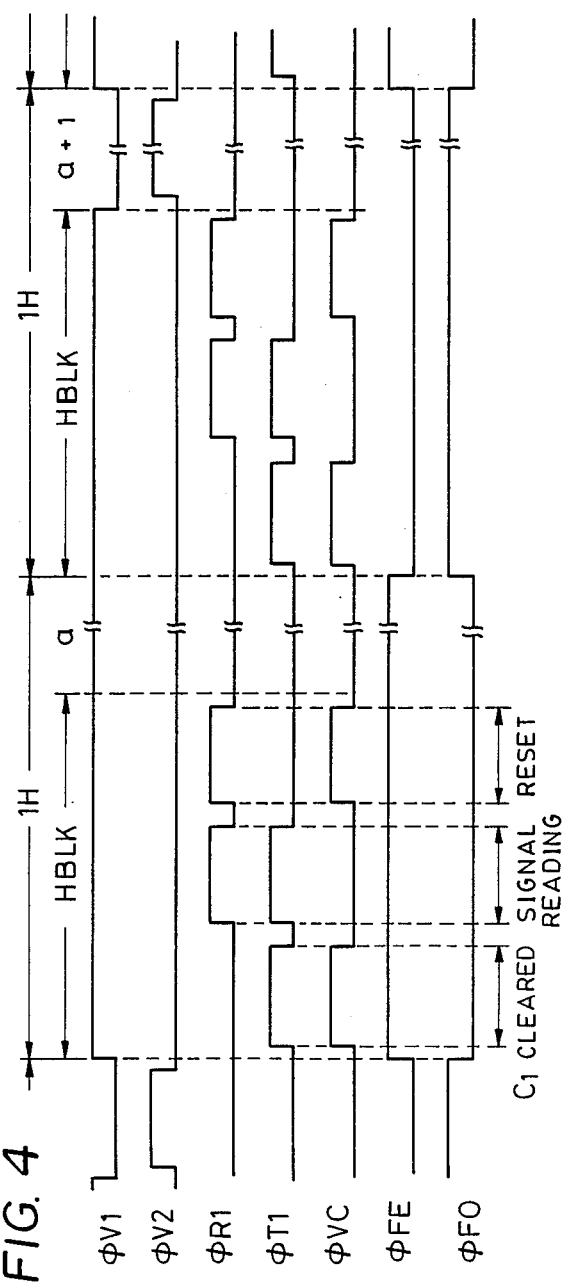

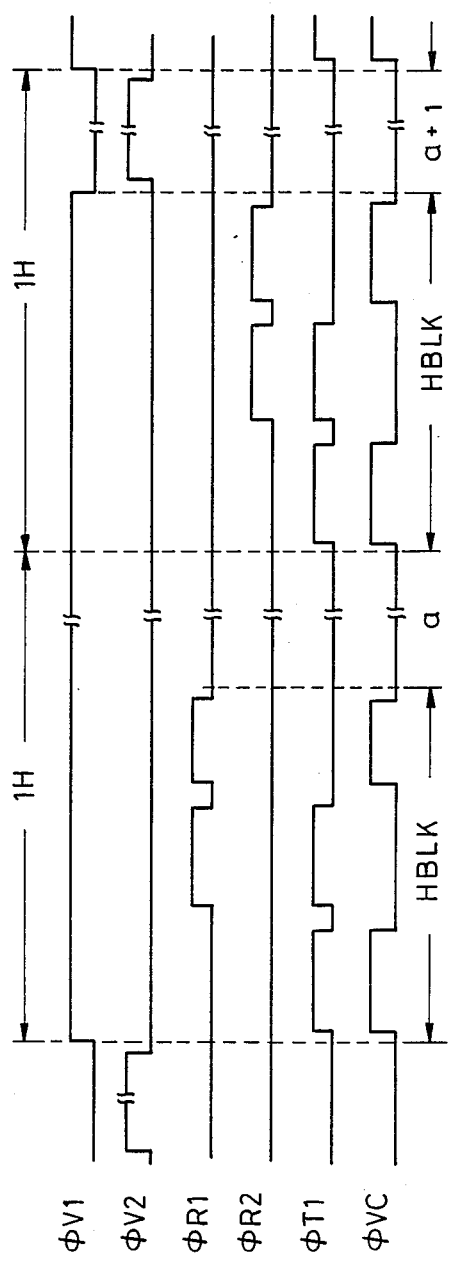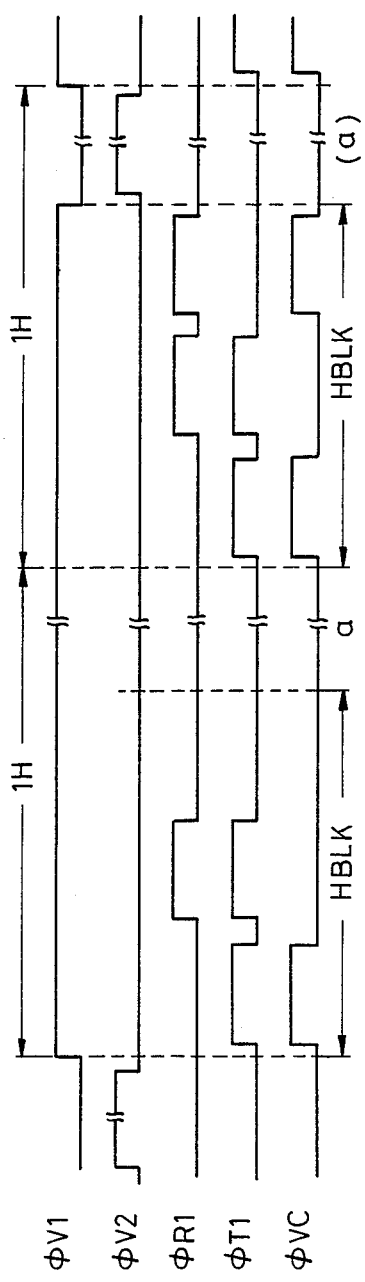

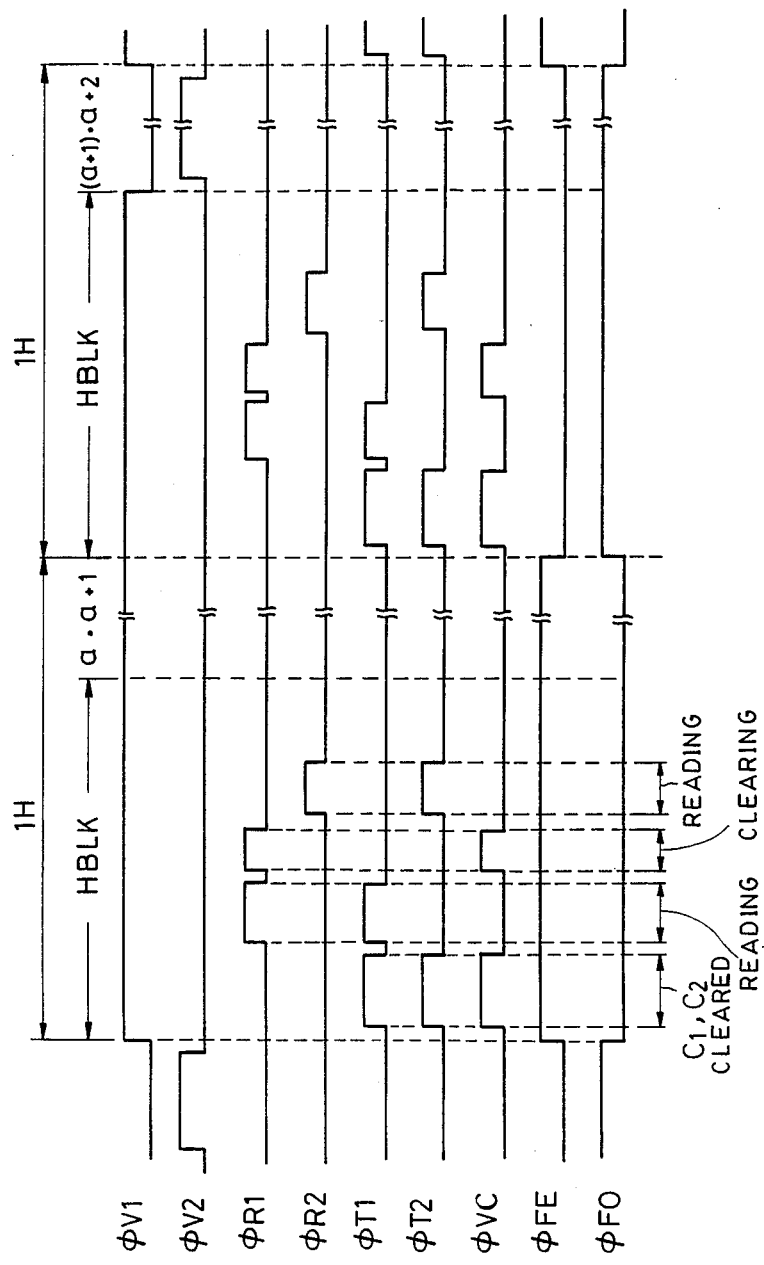

IMAGING APPARATUS HAVING ZOOM CAPABILITY VIA READOUT VARIATION

BACKGROUND OF THE INVENTION

1. Field of the Invention

The present invention relates to an imaging apparatus having the function for reading an image in a magnified size. This function will be referred to as a "zooming" function, hereinafter.

2. Description of the Related Art

A known zooming method will be described with reference to FIGS. 9A to 9C. FIG. 9A is an illustration of an image formed on an imaging device, including a portion to be zoomed out, while FIGS. 9B and 9C are timing charts showing, respectively, the manner in which vertical scan is conducted during the operation of an imaging apparatus in a zoom-out reading mode and the manner in which the horizontal scan is conducted along horizontal lines which include the image portion to be zoomed out.

Referring to FIG. 9A, an image of an object is formed on a two-dimensional imaging device 101. It is assumed that only a portion 102 of the image is to be displayed on a greater scale, while the other portions of the image are to be neglected. To this end, it is necessary that the signals from the portion of the imaging device 101 corresponding to the image portion 102 are read in the effective television period, while signals from the other portions are read during the horizontal and vertical blanking periods.

Referring also to FIG. 9B, the signals from the scanning lines 1 to (a-1), corresponding to an unnecessary portion of the image, are shifted at a high speed in a period $t_1$ within the vertical blanking period VBLK. The signals from the scanning lines a to b, covering the portion 102 of the image, are shifted at a low speed in a period $t_2$ which is the vertical effective period. In this vertical effective period, each of the horizontal lines a to b is horizontally scanned in a manner shown in FIG. 9C.

Subsequently, the signals from the lowermost unnecessary portion, corresponding to scanning lines (b+1) to n, are shifted at a high speed in the next vertical blanking period $t_3$.

The manner of the horizontal scan along each of the horizontal scanning lines a to b is conducted in a manner which will be explained hereinunder with reference to FIG. 9C. Namely, the signals from the unnecessary portion which is to the left of the image portion 102 to be zoomed out are shifted at a high speed in a period $t_{21}$ within the first horizontal blanking period. Then, the signals from the portion corresponding to the image portion 102 are shifted at a low speed in the effective period $t_{22}$. Finally, the signals corresponding to the unnecessary portion which is to the right of the image portion 102 are transferred at a high speed within the next horizontal blanking period $t_{23}$.

In the described zoom-out reading operation, assuming that the magnification is 2, the image portion 102 includes n/2 horizontal scanning lines. If this image portion 102 is displayed with the magnification 2 on, for example, a television screen, therefore, the quality of the image is impaired due to the presence of noise in the form of horizontal stripes. In order to obviate this problem, known imaging apparatus usually employ memory means or delay means which store or delay the zoomed-out read signals such that the signal for each line is used twice, so as to provide n pieces of scanning lines on the display, thereby to avoid degradation of the quality of the display image.

This known imaging apparatus, however, requires a large and complicated circuit to perform this function and, hence, the production cost is raised due to the use of the memory or delay means which is intended for the multiple use described above of the image signals. The same problem is encountered also with an apparatus of the type which employs interpolation between a pair of distant line signals or prediction of a next line signal from the preceding line signal.

The circuit is further complicated when the signals are read through a plurality of signal lines.

SUMMARY OF THE INVENTION

Accordingly, an object of the present invention is to provide an imaging apparatus having a zooming function, capable of overcoming the above-described problems of the present invention.

Another object of the present invention is to provide an imaging apparatus which is capable of improving the quality of a zoomed out display image, without necessitating any additional memory.

To these ends, according to the present invention, there is provided an imaging apparatus having an imaging device composed of pixels arranged in horizontal lines and vertical columns, and vertical scanning means and horizontal scanning means for scanning the imaging device vertically and horizontally. The apparatus has control means for enabling the vertical scanning means to scan the horizontal lines of pixels a plurality of times, thereby reading an image on the imaging device in a zoomed-out manner.

In this imaging apparatus, since the horizontal pixel lines are scanned a plurality of times, it is possible to compensate for the reduction in the number of the scanning lines in the zoom-out reading operation of the apparatus, thus ensuring a high quality of the display image. This remarkable effect is attained by means of a simple circuit because the memory means or delaying means used in known apparatus can be dispensed with.

The above and other objects, features and advantages of the present invention will become clear from the following description of the preferred embodiment when the same is read in conjunction with the accompanying drawings.

BRIEF DESCRIPTION OF THE DRAWINGS

FIG. 3 is a schematic timing chart illustrating the operation of a vertical scanning circuit incorporated in the embodiment shown in FIG. 1, during the operation in the zoom-out reading mode;

FIG. 4 is a timing chart illustrating an example of a first type of reading operation;

FIG. 5 is a timing chart illustrating another example of the first type of reading operation;

FIG. 6 is a timing chart illustrating an example of a second type of-reading operation;

FIG. 7, is a timing chart illustrating an example of a fourth type of reading operation;

DESCRIPTION OF THE PREFERRED EMBODIMENT

The preferred embodiment of the present invention will be described below with reference to the accompanying drawings.

Figure 1:
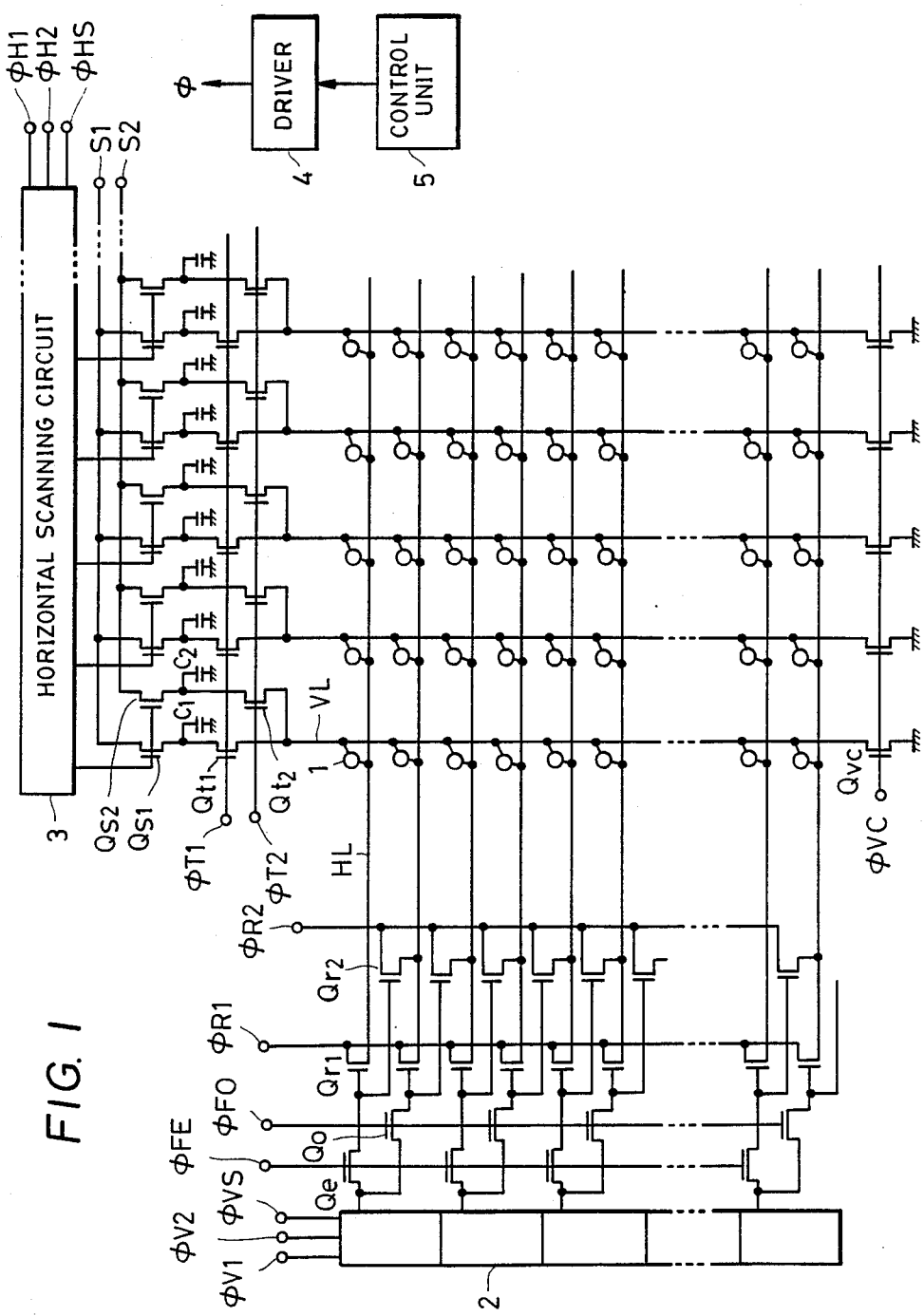
FIG. 1, is a schematic circuit diagram of an embodiment of the imaging apparatus in accordance with the present invention.

FIG. 1 is a schematic circuit diagram of an embodiment of the imaging apparatus in accordance with the present invention.

The imaging apparatus has an imaging device having a multiplicity of photo-sensors 1 which are arranged in the form of a matrix constituted by m rows and n columns. The photo-sensor 1 may be of any type, such as destructive reading type, non-destructive reading type, MOS type, electrostatic induction type, base accumulation type, and so forth.

The photo-sensors of each row are connected to a horizontal line HL. Thus, a plurality of rows of photo-sensors 1 are connected to corresponding horizontal lines HL, each of which is adapted to receive driving pulses $\phi R1$ and $\phi R2$ through transistors $Q_{r1}$ and $Q_{r2}$ respectively, whereby the lines of photo-sensors are driven independently for the purpose of reading of signals and resetting. The gates of the gate electrodes of the transistors $Q_{r1}$ and $Q_{r2}$ of each two adjacent horizontal lines are commonly connected and the common connections of these gate electrodes are connected to output terminals of a vertical scanning circuit 2 through transistors $Q_e$ and $Q_o$ which appear alternately for the successive horizontal lines HL.

The gate electrodes of the transistors $Q_e$ and $Q_o$ receive field selection pulses $\phi FE$ and $\phi OF$, respectively. Thus, the transistors $Q_e$, $Q_o$ and the transistors $Q_{r1}$, $Q_{r2}$ in combination constitute an interlace circuit.

The vertical scanning circuit 2 starts the scanning operation in response to a start pulse $\phi VS$ and successively outputs vertical scanning pulses in synchronization with the pulses $\phi V1$ and $\phi V2$.

On the other hand, the columns of the photo-sensors 1 are connected to corresponding vertical lines VL, each of which is connected to temporary storage capacitors $C_1$ and $C_2$ through shifting transistors $Q_t$ and $Q_{t2}$. The capacitors $C_1$ and $C_2$ are connected to signal lines S1 and S2, through scanning transistors $Q_{S1}$ and $Q_{S2}$. The gate electrodes of the scanning transistors $Q_{s1}$ and $Q_{s2}$ of each pair are commonly connected and the common connections of the successive pairs of scanning transistors $Q_{s1}$ and $Q_{s2}$ receive scanning pulses from the horizontal scanning circuit 3. More specifically, the horizontal scanning circuit 3 starts the scanning operation in response to a start pulse $\phi HS$ and outputs scanning pulses in synchronization with pulses $\phi H1$ and $\phi H2$.

Each vertical line VL is grounded through a transistor $Q_{vc}$ which receives at its gate electrode a pulse $\phi VC$.

The pulses $\phi$ mentioned above are supplied from a driver 4 which is controlled by a control unit 5.

Some types of zoom-out reading operation of the circuit shown in FIG. 1 will be explained with reference to FIGS. 2A to 2E. For the purpose of simplification of description, it is assumed that the zooming is conducted with magnification 2.

As explained before, for the purpose of zooming out an image with magnification 2, it is necessary to employ a suitable measure for utilizing twice the signal derived from each pixel in the portion of the image to be zoomed out.

Figure 2:
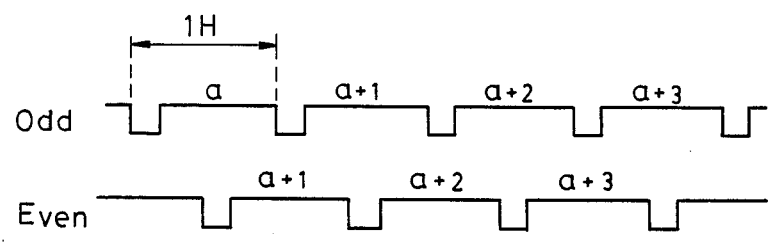
FIGS. 2A to 2E are illustrations of different types of zoom-out reading operation of the embodiment shown in FIG. 1.
Figure 2:
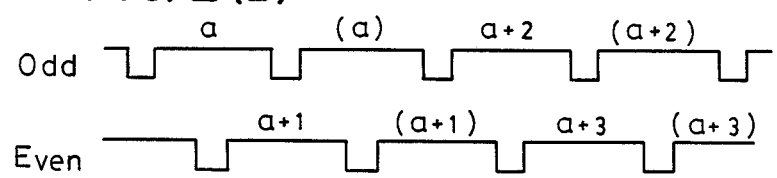
Figure 2:
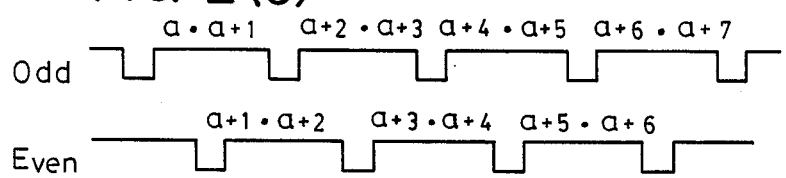
Figure 2:
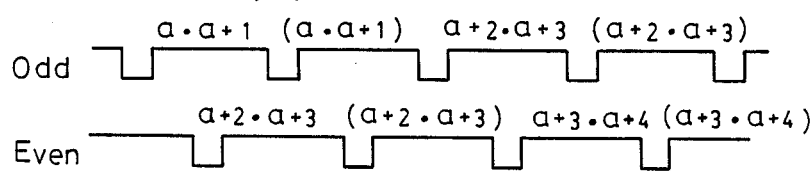
Figure 2:
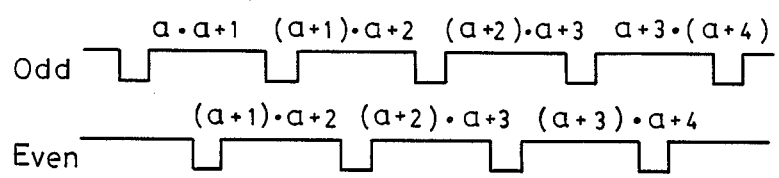
Figure 9A:
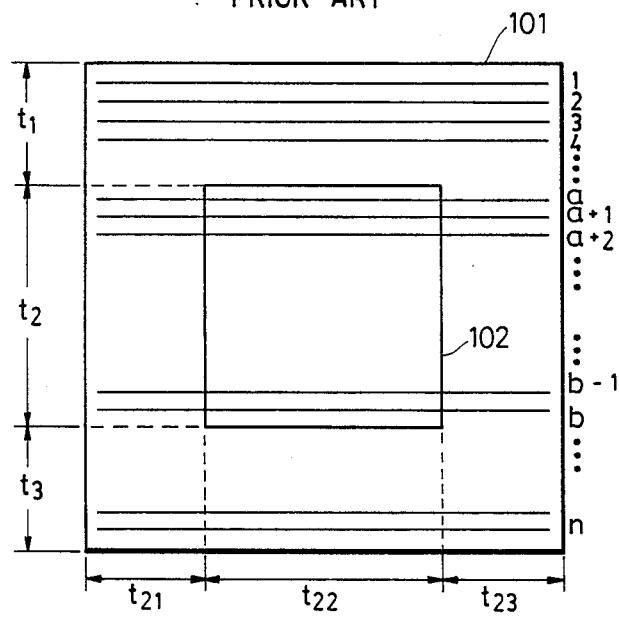
FIG. 9A is an illustration of an image on an imaging device, used for the purpose of explanation of zoom-out reading operation.
Figure 9B:
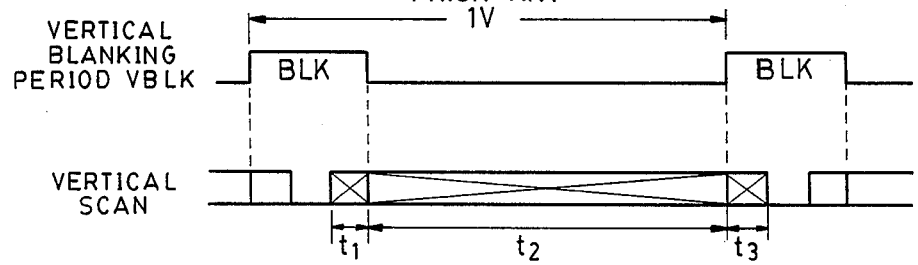
FIG. 9B is a timing chart illustrating the timing of vertical scanning in the imaging device shown in FIG. 9A.

In a first type of operation, illustrated in FIG. 2A, the horizontal pixel lines covering the image portion 102 (see FIG. 9A), i.e., scanning lines a to b, are scanned twice in a non-interlaced manner. More specifically, the scanning lines a, a+1, a+2, ..., b−1, b are sequentially read from an odd-number field of the display, and the same lines a to b are read again for the even-number field of the display.

In a second type of operation illustrated in FIG. 2B, the reading is conducted by means of a photo-sensor which is capable of enabling a signal to be read in a non-destructive manner. In this type of operation, therefore, the signal of the photo-sensor is not destroyed by the reading operation, and the pixel signals of each line are successively read twice. In this case, as will be seen from FIG. 2B, scanning lines are read as a, (a), a+2, (a+2), ... for the odd-number field of the display, where (a), (a+2), etc, each represents the second reading of the scanning line a, a+2, etc. For the odd-number field of the display, scanning lines are read as a+1, (a+1), a+3, (a+3), ..., as will be seen from FIG. 2B.

Although in the described reading methods the signals from each line are read through a single output line, this is not exclusive and the same methods can be adopted in a multiple-line reading system in which signals from a predetermined number of horizontal lines are read simultaneously through different output lines. FIG. 2C shows the ordinary reading operation in a double-line reading system, as an example of the above-mentioned multiple-line reading system. Thus, pairs of scanning lines 1,2; 3,4; ...; a, a+1; ... are read sequentially for the odd-number field, while pairs of scanning lines 2,3; 4,5; ...; a+1, a+2; ... are read for the even-number field.

FIG. 2D shows a third type of reading operation with the circuit shown in FIG. 1. In this case, the double-line reading system is used with both of the pair of scanning lines read in a non-destructive manner. Thus, scanning lines are read as a,a+1; (a,a+1); a+2,a+3; (a+2,a+3) ..., for the odd-number field, while the scanning lines are read as a+2,a+3; (a+2,a+3); ... for the even number field.

FIG. 2E shows a fourth type of reading operation in which the double-line reading system is used with only one of each pair of scanning lines read in the non-destructive manner. Thus, in this case, the scanning lines are read as a,a+1; (a+1),a+2; ... for the odd-number field, whereas, scanning lines are read as (a+1-),a+2; (a+2), a+3; ... for the even-number field.

Each of the four types of reading operation will be explained in more detail with reference to timing charts.

FIG. 3 is a schematic timing chart illustrating the operation of the vertical scanning circuit driven by the driver 4 in the zoom-out reading mode.

As explained before, the signals from the pixels in the unnecessary portions of the image are shifted at a high speed in the periods $t_1$ and $t_3$ within the vertical blanking periods, while the signals from the pixels in the image portion to be zoomed out are shifted in the effective period $t_2$. Thus, the vertical scanning circuit 2 starts to operate in response to a start pulse $\phi VS$ and sequentially outputs vertical scanning pulses in accordance with the pulses $\phi V1$ and $\phi V2$.

FIG. 4 is a timing chart illustrating a practical example of the first type of reading operation described before in connection with FIG. 2A. In this case, the scanning is conducted in a non-interlaced manner without using the pulses $\phi R2$. The photo-sensor need not be of nondestructive type.

As the first step, the pulse $\phi V1$ and the pulse $\phi FE$ for field selection are set high to enable the vertical scanning circuit 2 to output scanning pulses, thereby to turn on the transistors $Q_e$ and $Q_{r1}$ corresponding to the beginning scanning lines a and a+1 of the image portion 102 to be zoomed out. The transistors $Q_{r2}$ are not turned on because in this case the pulses $\phi R2$ are not used.

Subsequently, the pulses $\phi T1$ and $\phi VC$ are set high so as to turn on the transistors $Q_{t1}$ and $Q_{vc}$, thereby clearing the vertical lines VL and the temporary storage capacitors C1. Then, the transistors $Q_{vc}$ are turned off, and the pulse $\phi R1$ is set high, thereby driving the rows of photo-sensors constituting the pixels of the horizontal scanning line a. In consequence, signals on the photo-sensors or pixels on the scanning line a are read and stored in the capacitors $C_1$ through the transistors $Q_{t1}$.

Subsequently, the transistors $Q_{t1}$ are turned off, while the transistors $Q_{vc}$ are turned on so as to ground the vertical lines VL. Then, the pulse $\phi R1$ is set high high so as to reset the photo-sensors of the scanning line a.

Figure 9C:
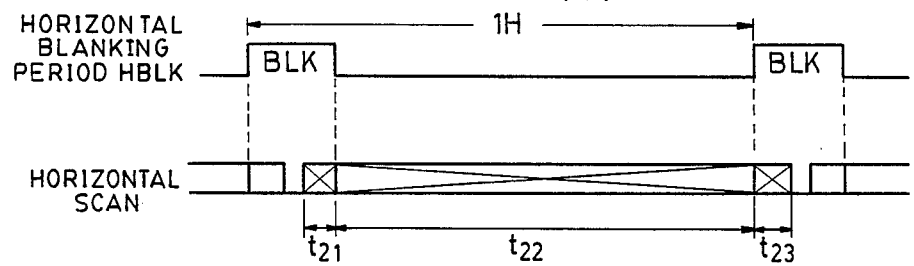
FIG. 9C is a timing chart illustrating the timing of horizontal scanning in the imaging device shown in FIG. 9A.

Then, the signals corresponding to the scanning line a stored in the capacitors $C_1$ are scanned by the horizontal scanning circuit 3 and are sequentially shifted to the signal line S1 through the transistors $Q_{s1}$. The shifting of the signals is conducted in such a manner that, as explained before in connection with FIG. 9C, the signals from the unnecessary portions of the image are shifted at a high speed in the periods $t_{21}$ and $t_{23}$ within the horizontal blanking periods, whereas the signals corresponding to the image portion 102 to be zoomed out are shifted in the horizontal effective period $t_{22}$.

The field selection pulse $\phi FE$ falls and, instead, the field selection pulse $\phi OF$ rises, when the shifting of all the signals from the scanning line a is finished. As a result, the transistors $Q_a$ are turned on so that the transistor $Q_{r1}$ corresponding to the scanning line a+1 is turned on. In this case, therefore, the clearing of the capacitors $C_1$, reading of signals and the resetting of the photo-sensors are conducted in connection with the scanning line a+1.

In the period of the horizontal shift of the signals from the scanning line a+1, the pulses $\phi V1$ and $\phi V2$ are set low and high, respectively, so that the vertical scanning circuit 2 shifts the position of output of the scanning pulse to the next stage and outputs the scanning pulse for the next stage when the next pulse $\phi V1$ is set high. Thus, the scanning is executed in non-interlaced manner so that the signals from the scanning lines a, a+1, a+2, ... are sequentially read for the even number field, while the same lines a+1, a+2, ... are read once again for the even number field.

FIG. 5 is a timing chart illustrating another practical example of the first type of operation explained before in connection with FIG. 2A. In this case, the field selection pulse $\phi FE$ is maintained at high level so that only the transistors $Q_e$ are turned on, and the non-interlaced scanning is executed only by means of the pulses $\phi R1$ and $\phi R2$.

As the first step, the pulse $\phi V1$ is set high so that the transistors $Q_{r1}$ and $Q_{r2}$ corresponding to the scanning lines a and a+1 are turned on.

As in the case of the operation explained in connection with FIG. 4, the capacitors $C_1$ are cleared and the signals from the photo-sensors on the scanning line a are read in accordance with the pulse $\phi R1$. The photo-sensors are then reset after the read signals are stored in the capacitors $C_1$.

After the capacitors $C_1$ are cleared, the same operation is conducted for the scanning line a+1 in accordance with the pulse $\phi R2$. The described operation is repeated to complete the first type of reading operation explained before.

By conducting the scanning in a non-interlaced manner as described, it is possible to avoid any degradation of the vertical resolution of the display image even when the reading and display are conducted in a zoom-out mode.

FIG. 6 is a timing chart illustrating a practical example of the second type of operation explained before in connection with FIG. 2B. This operation relies upon non-connection destructive reading of signals from the photo-sensors. In addition, the pulses $\phi FE$ and $\phi FO$ are inverted for each field. As the first step, the pulse $\phi FE$ is set high so as to turn the transistors $Q_e$ on. Then, the pulse $\phi V1$ is set high so that the transistor $Q_{r1}$ corresponding to the scanning line a is turned on. Then, as in the case of the operation explained in connection with FIGS. 4 and 5, the capacitors $C_1$ are cleared and the signals on the photo sensors of the scanning line a are read in a non-destructive manner and stored in the capacitors $C_1$. The photo-sensors are not reset because the signals carried by these sensors are read again in the next horizontal scanning period. Then, the horizontal scanning is conducted by the horizontal scanning circuit 3 in the same manner as in the reading operations described before.

Then, the capacitors $C_1$ are cleared in the next horizontal blanking period and the signals are read again from the photo-sensors of the scanning line a in accordance with the pulse $\phi R1$. The thus read signals are stored in the capacitors $C_1$ and then the photo-sensors are reset. In consequence, the signals (a) read from the same scanning line a are scanned.

Subsequently, the output position of the vertical scanning circuit 2 is shifted by one stage, and the operation described hereinbefore is conducted for the scanning line a+2, so that signals a+2, (a+2). This operation is repeated for other scanning lines to be included in the odd-number field.

Then, the field selection pulses $\phi FE$ and $\phi FO$ are inverted to enable the signals to be sequentially read from the scanning lines corresponding to the even-number field, whereby signals are obtained as a+1, (a+1), a+3, (a+3), ... as explained before in connection with FIG. 2B.

In this case, the same pixels can be scanned twice by virtue of the non-destructive reading function of the photosensors. Therefore, the reduction in the vertical resolution zooming out of the image can be compensated for without requiring any specific additional signal processing circuit, although a level correcting operation is needed. In consequence, the construction of the circuit, as well as the signal processing operation, can be remarkably simplified.

The third type of reading operation described before in connection with FIG. 2D will need no illustration because in this type of operation, the double-line reading system is applied to the second type of operation explained above.

FIG. 7 is a timing chart illustrating a practical example of the fourth type of operation described above. This operation is suitable for a color imaging apparatus which has a mosaic color filter provided on an imaging device having photo-sensors arranged in the manner shown in FIG. 1.

As the first step, pulses $\phi V1$ and $\phi EF$ are set high, while the pulse $\phi EO$ is set low, thereby turning on the transistors $Q_{r1}$ and $Q_{r2}$ corresponding to the scanning lines a and a+1.

Subsequently, the pulses $\phi VC$, $\phi T1$ and $\phi T2$ are set high, so as to turn on the transistors $Q_{vc}$, $Q_{t1}$ and $Q_{t2}$, thereby clearing the vertical lines VL, capacitors $C_1$ and the capacitors $C_2$.

Then, the transistors $Q_{vc}$ and $Q_{t1}$ are turned off and the signals on the photo-sensors of the scanning line a are read in a non-destructive manner in accordance with the pulse $\phi R1$ and are stored in the capacitors $C_1$.

Thereafter, only the transistors $Q_{vc}$ are turned on so as to clear the vertical lines VL. Simultaneously, the photosensors of the scanning line a are reset by the pulse $\phi R1$.

Then, only the transistors $Q_{t2}$ are turned on so that the signals are read in a non-destructive manner from the photosensors of the scanning line a+1 in accordance with the pulse $\phi R2$ and are stored in the capacitors $C_2$. The thus stored signals derived from the photosensors of the scanning lines a and a+1 are simultaneously shifted by the horizontal scanning circuit 3. The shifting is conducted in the manner described before in connection with FIG. 9C.

In next horizontal scanning period, the pulses $\phi FE$ and $\phi FO$ are inverted so that the transistors $Q_o$ are turned on with the result that all the transistors $Q_{r2}$ and $Q_{r1}$ having gate electrodes connected to the transistors $Q_o$ are turned on, whereby the scanning lines a+1 and a+2 are selected.

The capacitors $C_1$ and $C_2$ are cleared in this state and then the transistors $Q_{t1}$ are turned on, so that the signals on the photo-sensors of the scanning line a+1 are read once again in accordance with the pulse $\phi R1$ and the thus read signals are stored in the capacitors $C_1$.

Thereafter, the vertical lines VL are cleared and, simultaneously, the photo-sensors of the scanning line a+1 are reset. Then, the transistors $Q_{t2}$ are turned on so that the signals on the photo-sensors of the scanning line a+2 are read in a non-destructive manner in accordance with the pulse $\phi R2$. The thus read signals are stored in the capacitors $C_2$.

Thus, signals (a+1) and a+2 derived from the scanning lines a+1 and a+2, stored in the capacitors $C_1$ and $C_2$, are scanned by the horizontal scanning circuit 3 and are sequentially output through the signal lines S1 and S2.

The described operation is then repeated so that signals (a+2), a+3; . . . are successively read. Similarly, the signals are read as (a+1), a+2; (a+2), a+3; . . . , for the even number field, thus completing the fourth type of operation.

It is thus easy to zoom out the desired portion of an image on an imaging device even when a multiple-line reading mode is adopted, without requiring any complicated signal processing operation.

In addition, interpolation signals for interpolating the signals to be obtained from preceding and succeeding pixel lines can easily be formed by virtue of the nondestructive reading operation, whereby degradation in the vertical resolution can be avoided.

Figure 8:
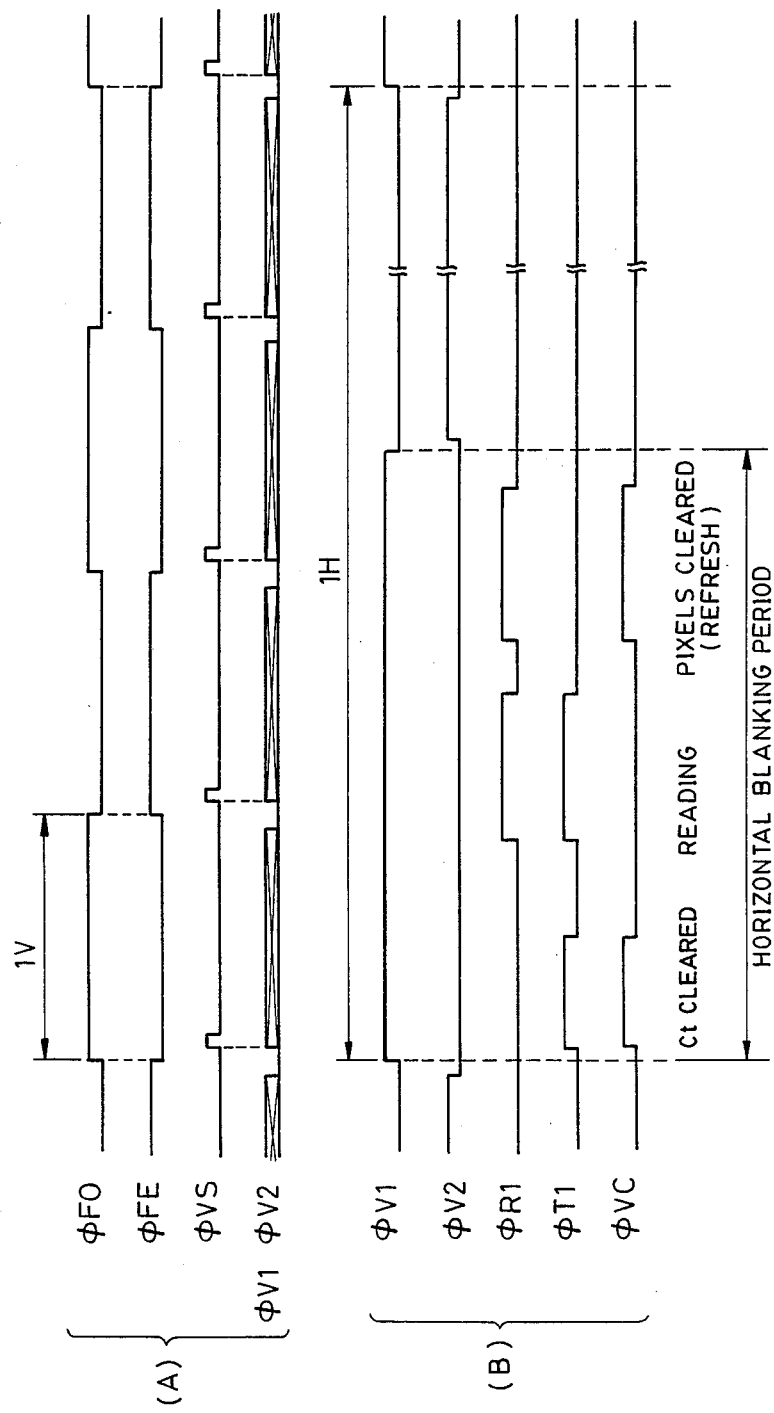
FIG. 8 is a timing chart illustrating a real-size reading mode of operation.

The operation of the apparatus in ordinary reading mode, i.e., when zooming is not conducted, will be understood from FIGS. 8A and 8B, which are illustrations of vertical scanning and horizontal scanning of this mode of operation.

As will be understood from the foregoing description, in the imaging apparatus of the present invention, horizontal lines of pixels are scanned a plurality of times so that the reduction in the number of scanning lines caused by the zooming out of a specific portion of an image is compensated for, thereby ensuring a high quality of the display image when this portion of image is zoomed out and displayed. In addition, this remarkable effect is attained without the need for any specific additional means such as memory means and delaying means which are required, in the known imaging apparatus of the kind described, thus simplifying the circuit construction and signal processing operation.

What is claimed is:

1. An imaging apparatus comprising an imaging device composed of pixels arranged in horizontal lines and vertical columns, vertical scanning means and horizontal scanning means for scanning said imaging device vertically and horizontally, and control means for enabling said vertical scanning means to scan said horizontal lines of pixels a plurality of times, to read an image on said imaging device in a zoomed-out manner.

2. An imaging apparatus according to claim 1, wherein said vertical scanning means is capable of operating selectively in one of an interlace scanning mode and a non-interlace scanning mode.

3. An imaging apparatus according to claim 1, wherein said pixels are of a type which enables a signal thereon to be read in a non-destructive manner.

4. An imaging apparatus according to claim 1, wherein said control means enables said vertical scanning means to simultaneously scan a plurality of said horizontal lines of pixels.

5. An imaging apparatus according to claim 1, wherein said control means enables said vertical scanning means to scan said horizontal lines of pixels in a line-by-line fashion.

6. An imaging apparatus comprising:
   (a) a plurality of pixels arranged in lines and columns and
   (b) control means for selectively switching reading operation mode between a first mode in which signals on said pixels are sequentially read in a first sequence and at a first speed and a second mode in which signals on a selected portion of an area of said pixels are sequentially read in a second sequence different from said first sequence and at a second speed different from said first speed, said second sequence being a sequence in which signals on one horizontal line of pixels are read for a plurality of times and the horizontal line of pixels from which the signals are read is sequentially shifted.

7. An imaging apparatus according to claim 6, wherein said second speed is higher than said first speed.

8. An imaging apparatus according to claim 6, wherein said first sequence is a sequence for sequentially reading signals on every other horizontal line of pixels.

9. An imaging apparatus according to claim 6, wherein said second sequence is a sequence for sequentially reading signals on successive horizontal lines of pixels in a line-by-line fashion.

10. An imaging apparatus according to claim 6, wherein said first sequence is a sequence in which signals are simultaneously read from pixels of a group of horizontal lines of pixels and then signals are simultaneously read from pixels of a next group of horizontal lines of pixels, thus conducting simultaneously reading of signals from each of successive groups of horizontal lines of pixels.

11. An imaging apparatus comprising:
a plurality of pixels arranged in lines and columns;
(b) switching means for selecting a mode of reading operation between a first mode in which signals are read from at least selected pixels at a first speed, and a second mode in which signals are read from said selected pixels at a speed which is different from said first speed; and
(c) control means for changing a number of times of reading signals from said selected pixels in accordance with the mode selected by said switching means.

12. An imaging apparatus according to claim 11, wherein said control means changes the number of times of reading in such a manner that a number of line signals obtained by reading in said first mode and the number of line signals obtained by reading in said second mode are equal.

13. An imaging apparatus comprising:
(a) imaging means having a predetermined area for receiving light to form an image thereon;
(b) reading capable of selectively reading a portion of said image on a predetermined area of said imaging means in one of a real-size reading mode and a zoom-out reading mode; and
(c) control means for changing, when said zoom-out reading mode is selected, a number of times of reading said portion of the image so that the number of times of reading said portion in the zoom-out reading mode is different from the number of times said portion is read in said real-size reading mode.

14. An imaging apparatus according to claim 13, wherein said control means changes the number of times of reading in such a manner that the number of signals read from said portion of the image in said zoom-out reading mode is greater than that in said real-size reading mode.

15. An imaging apparatus comprising:
(a) a plurality of pixels arranged in lines and columns; and
(b) control means for selectively switching a reading operation mode between a first mode in which signals on said pixels are sequentially read in a first sequence at a first speed and a second mode in which signals on a selected portion of an area of said pixels are sequentially read in a second sequence different from said first sequence and at a second speed different from said first speed, said second sequence being a sequence in which signals are simultaneously read from a group of horizontal lines of pixels for a plurality of times and the signals are then simultaneously read from pixels of a next group of horizontal lines of pixels for a plurality of times, thus conducting simultaneous reading of signals repeated from each of the successive groups of horizontal lines of pixels.

16. An imaging apparatus according to claim 15, wherein said second speed is higher than said first speed.

17. An imaging apparatus according to claim 15, wherein said first sequence is a sequence for sequentially reading signals on every other horizontal line of pixels.

18. An imaging apparatus according to claim 15, wherein said second sequence is a sequence for sequentially reading signals on successive horizontal lines of pixels in a line-by-line fashion.

19. An imaging apparatus according to claim 15, wherein said first sequence is a sequence in which signals are simultaneously read from pixels of a group of horizontal lines of pixels and then signals are simultaneously read from pixels of a next group of horizontal lines of pixels, thus conducting simultaneous reading of signals from each of successive groups of horizontal lines of pixels.

20. An imaging apparatus according to claim 15, wherein said pixels are of the type which enable a signal thereon to be read in a non-destructive manner.

21. An imaging apparatus comprising:
(a) a plurality of pixels arranged in lines and columns; and
(b) control means for selectively switching a reading operation mode between a first mode in which signals on said pixels are sequentially read in a first sequence at a first speed and a second mode in which signals on a selected portion of an area of said pixels are sequentially read in a second sequence different from said first sequence and at a second speed different from said first speed, said second sequence being a sequence in which signals are simultaneously read from pixels of a group of horizontal lines of pixels and then signals are simultaneously read from pixels of a group of horizontal lines of pixels and then signals are simultaneously read from pixels of a next group of horizontal lines of pixels, said next group of horizontal lines of pixels including at least one horizontal line belonging to the preceding group of horizontal lines, thus conducting simultaneous reading of signals from each, of successive groups of horizontal lines of pixels.

22. An imaging apparatus according to claim 21, wherein said second speed is higher than said first speed.

23. An imaging apparatus according to claim 21, wherein said first sequence is a sequence for sequentially reading signals on every other horizontal line of pixels.

24. An imaging apparatus according to claim 21, wherein said second sequence is a sequence for sequentially reading signals on successive horizontal lines of pixels in a line-by-line fashion.

25. An imaging apparatus according to claim 21, wherein said first sequence is a sequence in which signals are simultaneously read from pixels of a group of horizontal lines of pixels and then signals are simultaneously read from pixels of a next group of horizontal lines of pixels, thus conducting simultaneous reading of signals from each group of successive groups of horizontal lines of pixels.

26. An imaging apparatus according to claim 21, wherein said pixels are of the type which enable a signal thereon to be read in a non-destructive manner.

* * * * *

UNITED STATES PATENT AND TRADEMARK OFFICE
CERTIFICATE OF CORRECTION

PATENT NO. : 4,876,601

DATED : October 24, 1989

INVENTOR(S) : Seiji Hashimoto, et al.

It is certified that error appears in the above-identified patent and that said Letters Patent is hereby corrected as shown below:

TITLE PAGE:

[56] References Cited

"3,935,381 1/1986 Petrocelli et al" should read --3,935,381 1/1976 Petrocelli et al--.

"4,734,772 6/1987 Akiyama" should read --4,734,772 3/1988 Akiyama--.

[57] ABSTRACT:

Line 7, "a" should read --for a--.

COLUMN 1:

Line 41, "C." should read --9C.--.

COLUMN 2:

Line 23, "zoomed out" should read --zoomed-out--.

Line 66, "of-reading" should read --of reading--.

COLUMN 3:

Line 43, "$\phi OF,$" should read --$\phi FO,$--.

Line 53, "shifting transistors $Q_t$" should read --shifting transistors $Q_{t1}$--.

UNITED STATES PATENT AND TRADEMARK OFFICE
CERTIFICATE OF CORRECTION

PATENT NO. : 4,876,601
DATED : October 24, 1989
INVENTOR(S) : Seiji Hashimoto, et al.

It is certified that error appears in the above-identified patent and that said Letters Patent is hereby corrected as shown below:

COLUMN 5:

Line 12, "nondestructive" should read --non-destructive--.

Line 46, "field selection pulse $\phi OF$" should read --field selection pulse $\phi FO$--.

COLUMN 6:

Line 26, "non-connection destructive" should read --non-destructive--.

Line 53 "(a + 2)" should read --(a + 2) are obtained--.

COLUMN 8:

Line 5, "nonde-" should read --non-de- --.

Line 23, "required," should read --required--.

Line 52, "columns" should read --columns;--.

Line 54, "reading" should read --a reading--.

UNITED STATES PATENT AND TRADEMARK OFFICE
CERTIFICATE OF CORRECTION

PATENT NO. : 4,876,601

DATED : October 24, 1989

INVENTOR(S) : Seiji Hashimoto, et al.

Page 3 of 3

It is certified that error appears in the above-identified patent and that said Letters Patent is hereby corrected as shown below:

COLUMN 9:

Line 14, "simultaneously" should read --simultaneous--.

Line 37, "reading" should read --reading means--.
(First Occur.)

COLUMN 10:

Line 39-41, "a group of horizontal lines of pixels and then signals are simultaneously read from pixels of" should be deleted.

Line 63, "group" should be deleted.

SH 3

Figure 3, "(EFFCTIVE" should read --(EFFECTIVE--.

Signed and Sealed this

Twenty-third Day of April, 1991

Attest:

HARRY F. MANBECK, JR.

Attesting Officer

Commissioner of Patents and Trademarks